United States Patent
Fritsch et al.

(10) Patent No.: US 6,762,409 B2
(45) Date of Patent: Jul. 13, 2004

(54) METHOD AND DEVICE FOR DETERMINING THE THICKNESS AND GROWTH RATE OF AN ICE LAYER

(75) Inventors: Manfred Fritsch, Kleinpuerschuetz (DE); Felix Kerstan, Jena (DE); Nico Correns, Weimar (DE)

(73) Assignee: Carl Zeiss Jena GmbH, Jena (DE)

( * ) Notice: Subject to any disclaimer, the term of this patent is extended or adjusted under 35 U.S.C. 154(b) by 20 days.

(21) Appl. No.: 10/223,934

(22) Filed: Aug. 19, 2002

(65) Prior Publication Data

US 2003/0071217 A1 Apr. 17, 2003

Related U.S. Application Data

(63) Continuation-in-part of application No. 09/762,502, filed on Feb. 7, 2000, now abandoned.

(30) Foreign Application Priority Data

Jun. 7, 1999 (DE) .......................... 199 27 015

(51) Int. Cl.[7] .............................. G08B 19/02

(52) U.S. Cl. ................. 250/339.07; 250/341

(58) Field of Search ............. 250/339.01, 339.06, 250/339.07, 339.11, 340, 341.1; 244/134 R, 134 F; 73/170.26; 340/962; 356/328

(56) References Cited

U.S. PATENT DOCUMENTS 6,052,056 A * 4/2000 Burns et al. ............... 340/583

* cited by examiner

Primary Examiner—Constantine Hannaher
Assistant Examiner—Timothy Moran
(74) Attorney, Agent, or Firm—Reed Smith LLP

(57) ABSTRACT

A method and a device are disclosed for determining the thickness and growth rate of an ice layer on structural component parts, particularly of aircraft, wherein the thickness and growth rate of an ice layer are determined and displayed in a simple, economical and dependable manner. To this end, a method is disclosed by which the radiation incident on a surface covered by an ice layer or disturbing layer is separated spectrally by a holographic grating connected with a line receiver into enough wavelength regions that a correction of the ice absorption is achieved by comparing the measured radiation with a stored reflection curve of an uncoated surface and by combining the comparison values and determining the peak area in the wavelength region of the ice absorption, and wherein from the thickness of the ice layer and disturbing layer and the ice thickness values obtained in the measurement intervals the growth rate of the ice layer is determined and displayed. The device for carrying out the method comprises a window which is provided in the surface covered by an ice layer or disturbing layer and through which a beam impinges on a holographic grating via an optical imaging system and an entrance slit, is separated by wavelength, imaged on a line receiver and evaluated by a controlling and evaluating unit, and the evaluated data are displayed on a display.

27 Claims, 4 Drawing Sheets

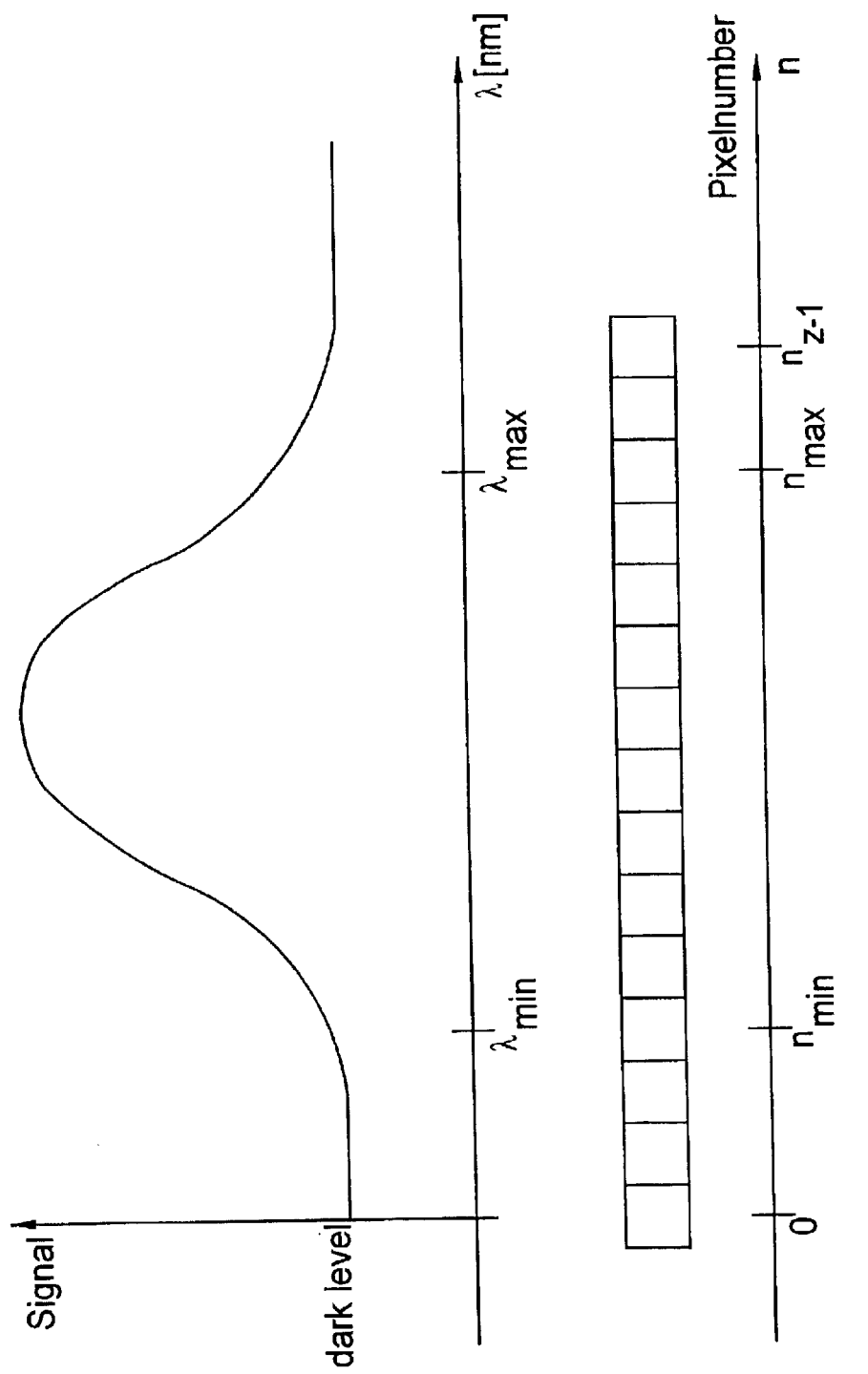

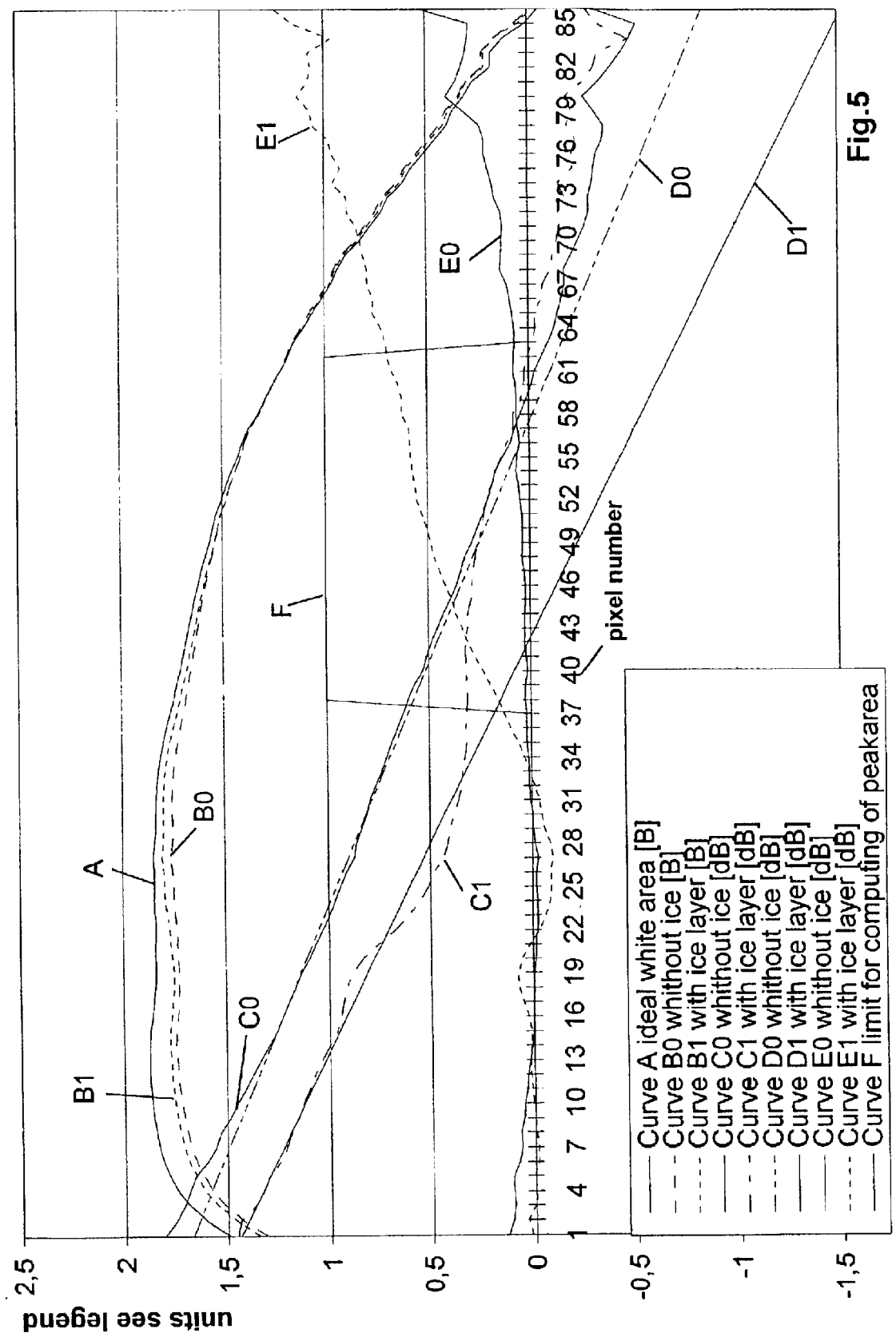

METHOD AND DEVICE FOR DETERMINING THE THICKNESS AND GROWTH RATE OF AN ICE LAYER

This is a continuation-in-part application of application Ser. No. 09/762,502 the entire disclosure of which is incorporated herein by reference, which is the National Stage of International Application No. PCT/EP00/05040 filed Jun. 2, 2000. 09/762,502 claims foreign priority to DE 199 27 015.5 filed Jun. 7, 1999, priority to which is also claimed herein.

The invention is directed to a method for determining the thickness and growth rate of a layer of ice on structural component parts of means of transport, particularly aircraft such as airplanes, helicopters and wind-driven power stations or the like, and to a device for carrying out the method, in which the surface of a structural component part which is to be monitored and which is covered by an ice layer and/or disturbing layer is illuminated in such a way that the radiation passing through the ice layer and/or disturbing layer is measured and evaluated in different wavelength regions.

Methods and devices for carrying out the method which are known from the prior art measure the surface state of traffic routes with respect to black ice, icing and any present deicing agents and also detect ice formation and frost formation on fixed surfaces such as road surfaces in order to inform travelers of road conditions in the event of unforeseen weather situations. Icing of roadways and sudden formation of glaze ice do not present dangers only in road traffic; in rail traffic and air travel, also, iced structural component parts due to freezing water also pose a threat. Iced structural component parts on aircraft, for instance, particularly on structural component parts in the wing area which move relative to one another, lead to hindrance of air traffic and are a considerable threat to air safety; on the other hand, even a small ice formation on vulnerable structural component parts of aircraft can lead to a drastic change in the profile characteristics of the utilized structural component parts. While more and more flights can be carried out under the most adverse weather conditions thanks to modern navigation systems, e.g., radar guidance or direction-finding systems, there is also a rise in the potential risk of icing of aircraft. Particularly smaller aircraft with only simple deicing systems, or none at all, fly more and more often under weather conditions favoring icing. For example, if ice forms on the aircraft on the ground, the pilot must decide whether icing is within permissible limits or whether the ice layer should be removed before starting. Therefore, determination of the thickness of the ice and the positive or negative growth rate of a layer of ice is crucial for general flight safety as an important criterion for assessing the potential danger posed by a developing and changing layer of ice. The thickness of the ice layer is also significant for optimal use of deicing agents.

WO 96/26430 discloses a method for determining the surface state of travel routes and a device for carrying out the method in which, by means of spectroanalytic determination of water and ice on a fixed road surface in four different wavelength ranges by reflection measurement through the ice layer, the formation of ice and frost can be detected as a function of the respective degree of crystallization and the thickness of the ice layer on the surface can be taken into account. However, the different spectral shape of the absorption of the dry roadway surface is not compensated in the predetermined four wavelength ranges, so that while conclusions may be drawn concerning the surface state, accurate determination of the thickness of the ice layer is not possible.

DE 195 06 550 discloses another method for spectrometric determination of water and ice on roads and an arrangement for implementing the method by which formation of ice or frost on fixed surfaces can be determined depending on the respective degree of crystallization; but there is no compensation of the spectral shape of the reflectivity of the road surface by interfering surfaces or coating and by external light sources (daylight), so that it is impossible to determine with exactitude the thickness of the ice layer and its growth rate.

Proceeding from the prior art mentioned above, the invention has the object of providing a method for dependably determining the thickness and growth rate of an ice layer in a very accurate manner over longer time periods and a device for implementing the method which is economical and reliable and which permits the exact thickness of an ice layer as well as its growth rate to be determined in a simple manner.

In order to meet this object, the invention proposes a method by which the radiation incident on a surface covered by an ice layer and/or disturbing layer is separated spectrally by an imaging holographic grating connected with a line receiver into enough wavelengths that a correction of the ice absorption is achieved by comparing the measured radiation with a stored reflection curve of an uncoated surface and by combining the comparison values and determining the peak area in the wavelength region of the ice absorption, and wherein the thickness of the ice layer and/or disturbing layer and—by means of the ice thickness values obtained in the measurement intervals—the growth rate of the ice layer are determined and displayed.

Accordingly, the method according to the invention not only makes possible an accurate determination of the thickness of an ice layer and its growth rate, preferably on structural component parts of aircraft, but also makes it possible to detect the thickness of disturbing coverings, e.g., water, dirt and deicing agents. Further, the positive and negative growth rate of an ice layer is determined by comparison calculations from a sufficient number of determined ice thickness values, so that the ice layer thickness and its growth rate on the surface of structural component parts of aircraft can also be determined in advance for briefly changing weather conditions and climatic influences.

Due to the fact that the thickness of the ice layer and/or disturbing layer is determined on a surface to be monitored, this method can also be used not only to determine ice thickness but to detect dry layers of dirt, so that additional risk states caused by contamination of structural component parts can be eliminated by means of the method.

It is advantageously provided that the determined absorption curves can be evaluated by a simple algorithm by means of a microprocessor of the controlling and evaluating unit and a fast, accurate determination of the ice layer thickness and its growth rate is accordingly ensured using the existing technical resources in an aircraft.

The spectroanalytic measurement is preferably provided in wavelength ranges from approximately 850 to 1150 nm, wherein the light is separated spectrally into so many wavelength regions that the spectral dependency of disturbing coatings such as water, dirt and deicing agents and of different light sources such as daylight, twilight and artificial lighting can be detected and used for correcting the ice absorption.

Further, it is preferably provided that the measured values of an uncoated surface are stored in a controlling and evaluating unit as comparison values.

In addition, in order to increase measurement accuracy it is advantageously provided that the measured values from the long-wave end of the spectral region are removed from all measured values of a surface coated with an ice layer and/or disturbing layer because the light sensitivity, e.g., of a silicon receiver line, is negligibly small at that location.

Another advantage consists in that the ice thickness is determined in millimeters from the peak area which is proportional to the thickness of the ice layer by means of a conversion factor.

In addition, it is advantageously provided that the growth rate of the ice layer is determined from a large number of determined ice thickness values.

A particularly preferred further development consists in that the controlling and evaluating unit additionally issues a warning to clean the window or change the light source when the measured signal falls below a threshold in spite of the light source being switched on. In this way, additional sources of error can be eliminated from the determination of the thickness and growth rate of an ice layer.

A device for carrying out the method is preferably constructed as a spectrometer, wherein a window is provided in the monitored surface that is covered by an ice layer and/or disturbing layer, through which window a beam impinges on an imaging holographic grating via an optical imaging system and a source slit or entrance slit, is separated by wavelength, imaged on a line receiver and evaluated by means of a controlling and evaluating unit, and the evaluated data are displayed on a display.

In a preferred variant, the beam falling through the window in the surface covered with an ice layer and/or disturbing layer impinges directly on the holographic grating through the entrance slit.

In addition, it is preferably provided that a light source for illuminating the window that is provided in the surface covered by an ice layer and/or disturbing layer is arranged above the surface.

In an advantageous embodiment form, the light source for illuminating the window that is provided in the surface covered by an ice layer and/or disturbing layer is arranged below the surface.

In certain cases, a plurality of light sources which are arranged particularly annularly in a base body can also preferably be provided for illuminating the window that is provided with a surface covered by an ice layer and/or disturbing layer.

A further advantage consists in that, given sufficient daylight, the light source for illuminating the surface covered with an ice layer and/or disturbing layer is not turned on by the controlling and evaluating device.

In an advantageous further development of the invention, the arrangement of a semitransparent mirror in front of the optical imaging system results in an accurate and uniform illumination of the surface covered by an ice layer and/or disturbing layer.

Another preferred embodiment form consists in that the evaluating data can be sent to an existing data bus system, for example, in an aircraft.

Further, it is advantageous that the device is provided with an entrance slit, holographic grating, line receiver, and controlling and evaluating unit as a compact structural component part for all-purpose use.

The invention is directed to an apparatus for determining the thickness of a layer of ice on the surface of a stationary or moving object, for example, of a building or aircraft, in which illumination light is initially directed to a portion of the surface of the object and then strikes a reception device, the reception device contains dispersive optics for spectral dispersion of the illumination light coming from the surface portion and a detector for receiving the spectrally dispersed illumination light, an evaluating device for determining intensity values of the illumination light influenced by the ice layer at different wavelengths $\lambda$ and for comparing these intensity values with reference values from a surface that is free of ice, the reception device is arranged inside the object, and the surface of the object has, at the portion to which the illumination light is directed, a window that is transparent for the illumination light and through which the illumination light passes.

In a preferred construction of the invention, the reception device comprises an optical imaging system, an entrance slit, an imaging holographic grating and a silicon detector having individual reception elements. After passing through the window and being influenced by the ice layer, the illumination light is directed via the imaging system and entrance slit to the holographic grating, where it is spectrally dispersed.

The spectrally dispersed light strikes the silicon detector, each of whose reception elements receives an associated spectral component and an associated wavelength $\lambda$ and converts it into a reception signal which corresponds to the intensity of the light at this wavelength $\lambda$. The reception elements are also commonly known in technical circles as pixels.

A computation circuit is provided in the evaluating device for processing the reception signals. The computation circuit is linked to at least one clock generator and an analog-to-digital converter. These components are advantageously combined in an integrated circuit.

The reception signals are read out of the silicon detector in the rhythm of a predetermined clock frequency, converted into digital values by the analog-to-digital converter and supplied to the computation circuit. The digitized values are processed in the computation circuit essentially as follows:

Net signals are calculated from the individual reception signals, while the reception signals of the pixels for which no light signal has been detected are ignored.

A spectral range $\lambda_{min1}$ to $\lambda_{max1}$ is selected from the total spectrum received by the detector and the values of the reception signals originating from this spectral range $\lambda_{min1}$ to $\lambda_{max1}$ are logarithmized.

The logarithmized net signals are then multiplied pixel by pixel by an evaluation function B(n) and summed corresponding to the following function: $I_1=\Sigma*B(n)*L(n)$. A value $I_0$ determined in the same way as value $I_1$ is subtracted from the result $I_1$, but based on the reception signals that are registered when no ice layer is present on the surface.

Value $I_0$ is, for example, determined once during the manufacture of the apparatus. It can also be updated occasionally, for example, in order to calibrate the apparatus.

The value $I=I_1-I_0$ corresponds to the thickness of the ice layer and is advantageously indicated on the display as a measurement number in units of mm.

Further, the evaluating device can be outfitted with a data storage for the values $I_1$ determined at given time intervals and can comprise another computation circuit which compares the values $I_1$ determined at different times with one another and determine information about the change in thickness of the ice layer over time from this comparison. The increase or decrease in thickness of the ice layer over a given time period can easily be determined from this change and can likewise be indicated on the display.

Daylight as well as light from an artificial light source may be used as illumination light. The artificial light source is arranged in the vicinity of the window for this purpose. The light source can be located outside the object or, alternatively, can also be accommodated inside the object, for example, inside the wing of an aircraft. In this case, the artificial light source is arranged in the vicinity of the window, so that the light radiated by the light source initially passes through the window and then reaches the reception device.

On the other hand, the reception device is always arranged in the interior of the object, so that the illumination light passes through the ice layer and window to reach the reception device when the light source is arranged externally. If the light source is positioned in the interior of the object, the light initially passes outward through the window to the ice layer, is reflected by the latter, and passes through the window again before reaching the reception device.

When the light source, like the reception device, is also arranged in the interior of the object, all components of the apparatus according to the invention are advantageously accommodated so as to be protected from climatic influences.

An infrared light source can be provided, for example, as artificial light source. However, other light sources can be used also and, as was stated above, it is also possible to use daylight of sufficient brightness for evaluation.

According to the invention, wavelengths $\lambda$ in the range of about 850 nm to 1150 nm are preferably used for evaluation. It is advantageous when the window is constructed as an optical filter which is transparent for light in the wavelength range from 850 nm to 1150 nm. In this way, all other spectra of no significance for the evaluation can be filtered out.

Another particular construction of the invention has a threshold switch which is coupled to a sensor for evaluation of the daylight brightness and which is connected to the artificial light source in such a way that the light source is switched on only when the brightness of the daylight is below a given threshold and is not sufficient for evaluation.

The evaluating device is connected to a display for indicating the measurement results.

In another option for displaying the measured values on the display, the evaluating device is coupled to an acoustic or optical warning device to notify of measurement results below a given limiting value.

The invention is not limited only to the observation and measurement of ice formations on the surface of the object under consideration. It can also be used in a technically equivalent manner to observe and measure other kinds of deposits on the surface capable of optical evaluation, such as deposited dust, moisture coating, deposits of deicing agents and the like.

Embodiment examples of the invention are shown in the drawings and described more fully in the following.

FIG. 1a shows an example of the arrangement and the use of the reception elements of a silicon detector;

FIG. 5 shows absorption curves for different surface states.

Figure 1:
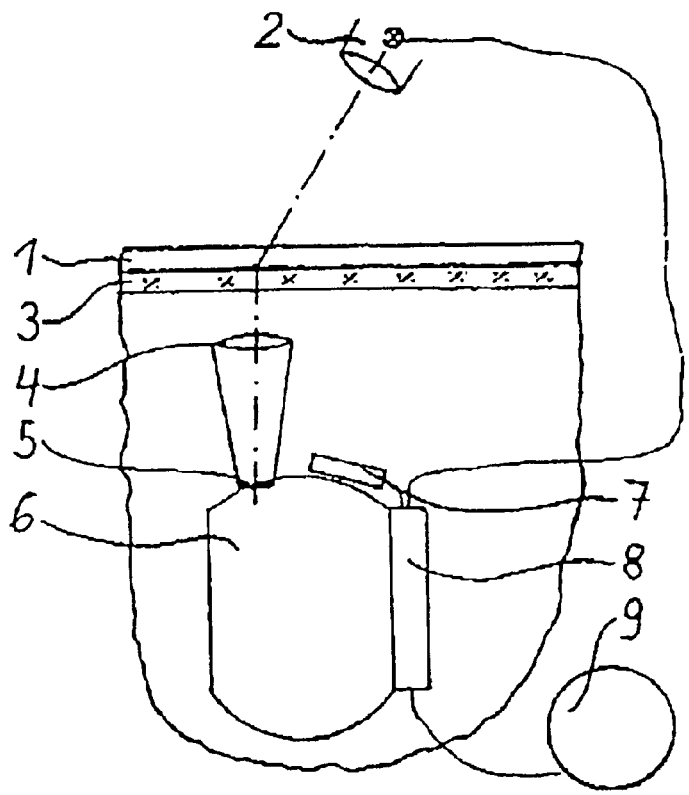
FIG. 1 shows a basic view of a first embodiment form of the apparatus.

In the embodiment form shown in FIG. 1, a light source 2 is located over a surface, for example, the surface of the wing of an aircraft, which is coated by an ice layer 1. The light source 2 illuminates a window 3 which is arranged in this surface.

The light radiated by the light source 2 passes through the window 3, strikes an optical imaging system 4 arranged behind the window 3 and is directed from the latter through an entrance slit 5 to an imaging holographic grating 6, where it is dispersed according to wavelength $\lambda$. The spectrally dispersed light is imaged on a silicon detector 7.

With sufficiently bright daylight, the light source 2 need not be switched on, so that, instead of the light radiated by the light source 2, only daylight passes through the window 3 and is imaged in a spectrally dispersed manner on the silicon detector 7.

In principle, the silicon detector 7 can comprise reception elements, also called pixels in technical circles, which are arranged in a row. In this case, a wavelength $\lambda$ would be associated with each pixel n of the line. However, greater measurement certainty is achieved by using a surface receiver having a plurality of rows and columns arranged in matrix form. In this case, for example, all reception elements of a column supply signal values for one and the same wavelength $\lambda$. Alternatively, it is also possible to use a plurality of line receivers arranged in parallel, wherein there is also an arrangement of the reception elements in rows and columns and the advantages of the surface receiver are achieved. However, the expenditure on computation for linking the reception signals is higher.

For the sake of simplicity, the evaluation is explained with reference to only one receiver row in the following.

As can be seen from FIG. 1a, a defined wavelength $\lambda$ from the spectrum of the light imaged on the silicon detector 7 is associated with each individual pixel n of the receiver row. Accordingly, pixel $n_{min}$ receives the light of wavelength $\lambda_{min}$, pixel $n_{max}$ receives the light of wavelength $\lambda_{max}$.

When a number of apparatus according to the invention are produced, it must be taken into account that the assignment of wavelengths $\lambda$ to the pixels n is influenced by manufacturing tolerances in the individual component parts and their positioning relative to one another. Therefore, in order to ensure comparability of measurement results between a plurality of apparatus, the assignment of wavelengths $\lambda$ must be determined one time for every apparatus. This will be described more exactly in the following with reference to FIG. 5.

The window 3 is preferably constructed as an optical filter which only passes a spectral range of light provided for evaluation, e.g., greater than $\lambda_{min} \approx 850$ nm.

In practical application, the spectral range to be evaluated has an upper limit at $\lambda_{min} \approx 1100$ nm because of the sensitivity limit of the silicon detector 7. The spectral range to be evaluated has a lower limit at $\lambda_{min} \approx 850$ nm due to the filter material.

In every case, the spectral range imaged on the silicon detector 7 by the grating 6 is greater than the spectral range from $\lambda_{min}$ to $\lambda_{max}$ provided for evaluation, even with an unfavorable combination of manufacturing tolerances. Therefore, there are pixels on the silicon detector 7 which lie outside of the limits $\lambda_{min}$ to $\lambda_{max}$ and from which no light signal is detected. In FIG. 1a, for example, these are the pixels from 0 to $n_{min}$ and the pixels beyond $n_{max}$ to $n_{z-1}$.

In the present embodiment example, the window 3 is constructed as an optical filter. Alternatively, however, the optical filter can also be integrated in the imaging optics 4, or the window 3 can be constructed as a filter and another filter can also be provided in the imaging optics 4. In every case, the filters serve for selecting a spectral range provided for the evaluation.

The evaluating unit 8 comprises at least one computation circuit which is coupled to at least one clock generator and to an analog-to-digital converter.

The clock generator generates clock signals for reading out the reception signals of the silicon detector 7. The reception signals of every pixel of the silicon detector 7 are converted into digital form by the analog-to-digital converter and are supplied to the computation circuit. The following processes take place in the latter for processing the reception signals of the individual pixels n:

net signal values are calculated from the reception signals by subtracting the mean dark signal from all values. The mean dark signal is the average of the signals of the pixels on which no light signal is detected (pixels 0 to $n_{min}$ and pixels $n_{max}$ to $n_{z-1}$ in FIG. 1a);

a spectral range $\lambda_{min1}$ to $\lambda_{max1}$ is selected which lies within the total received spectrum $\lambda_{min}$ and $\lambda_{max}$, and the net signal values from this spectral range $\lambda_{min1}$ and $\lambda_{max1}$ are logarithmized. The limits $\lambda_{min1}$ and $\lambda_{max1}$ are determined in such a way that only positive signal values occur even when taking into account the detector noise (otherwise, it is not possible to form logarithms), the logarithmized net signal values L(n) are multiplied pixel by pixel by an evaluation function B(n) and summed corresponding to the following function:

$$I_1 = \Sigma * B(n) * L(n).$$

Calculation of the evaluation function B(n) will be described in the following with reference to FIG. 5.

Finally, a value $I_0$ is subtracted from the result $I_1$. The value $I_0$ is also calculated in the manner described above, but from the reception signals that are detected when no ice layer is present on the surface. The value $I_0$ can be determined once during the manufacture of the apparatus or can also be updated occasionally. The value $I=I_1-I_0$ corresponds to the thickness of the ice layer and can be displayed, for instance, by millimeter length units.

Further, the growth rate of the ice layer can be determined from several measurement results $I_1$ which are determined after the expiration of given periods of time, or are determined from the trend of preceding measurements.

The thickness of the ice layer, its growth rate or its tendency to change are shown on the display 9 or transferred to a master computer for further processing.

In other words, in the embodiment form according to FIG. 1, a light source 2 is located above a surface of a structural component part, for example, of an aircraft or wind power plant, which surface is coated, due to freezing rain or other climatic influences, by an ice layer and/or disturbing layer 1 such as water, deicing agents or dirt; this light source 2 illuminates a window 3 which is provided in the surface of the structural component part, which surface is to be monitored and is covered by an ice layer and/or disturbing layer 1.

With sufficient daylight, the light source 2 is not turned on, so that only the sunlight falls on the monitored surface covered by an ice layer and/or disturbing layer 1 and passes through this surface and the window 3. In so doing, the light impinges, via an optical imaging system 4 through an entrance slit 5, on an imaging holographic grating 6 where it is divided according to wavelength and imaged on a silicon detector line 7. In so doing, no specularly or directionally reflected light from the surface to be examined may impinge on the device constructed as a spectrometer. The light, e.g., a 5 W bulb, is sufficient for an adequate output signal of the spectrometer with silicon detectors, also with diffuse reflection of the surface to be examined. The incident light is separated by the grating 6, in combination with the line receiver 7, into at least enough wavelength regions so that the spectral dependency can be detected independent from disturbance covering, e.g., water, deicing agents, dirt, and independent from different light sources such as daylight, twilight and lamplight and can be used to correct the ice absorption. The measurement intervals are selected so as to be short enough that a trend analysis for the rate of change of the ice layer and/or disturbing layer 1 can be derived from a sufficient number of the previously covered values.

The imaged spectrum covers a wavelength range of approximately 900 to 1150 nm. When a spectrometer is used, its spectral bandwidth should be small enough that the bands for water and ice can be safely separated, but should not be much smaller so as not to reduce the light throughput unnecessarily and to minimize noise. The spectral bandwidth can be 20 nm, for example. A controlling and evaluating unit 8 provides the necessary conditions, such as the necessary operating voltages and the clock signals for controlling the silicon detector line 7, and evaluates the given voltages. When the sunlight is inadequate for evaluation, the controlling and evaluating unit 8 turns on the light source 2. If the measured signal falls below a threshold in the spectral region not affected by coating even when the light source 2 is turned on, the controlling and evaluating unit 8 also issues a warning to clean the window 3 or change the light source 2. In addition, the controlling and evaluating unit 8 supplies the light source 2 with a fixed low voltage to lengthen its life. The results of the evaluation can either be displayed on a display 9 or can be sent to the data bus system, not shown, of an aircraft.

Figure 2:
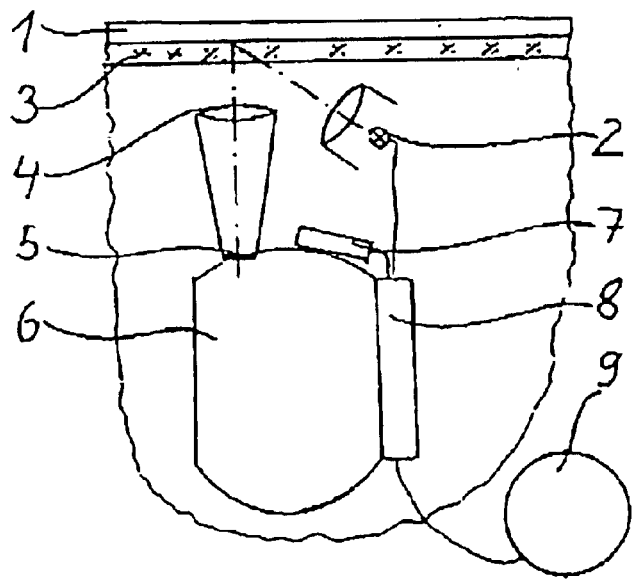
FIG. 2 shows a basic view of a second embodiment form of the device.

FIG. 2 shows a second embodiment form of the apparatus in which the light source 2 is arranged below the surface, for example, in the interior of the wing of an aircraft. The option that the light source is switched on only when the intensity of the daylight coming through the window 3 from the outside is not sufficient for evaluation also applies in this case.

The light from the light source 2 falls on the entrance slit 5 after nondirected reflection at the inner surface of the window 3 via the optical imaging system 4. In this connection, it is advantageous that all component parts of the apparatus are accommodated inside the wing and are accordingly extensively protected from external influence.

In this case, for signal processing in the evaluating unit 8, it must be taken into account that with illumination by the internal light source 2 the light must traverse the ice layer 1 two times.

Additionally, FIG. 2 shows a second embodiment form of the device in which the surface to be monitored which is covered by an ice layer and/or disturbing layer 1 is illuminated from the inside through the window 3 by means of a light source 2 arranged in the device below the surface when there is insufficient daylight, so that the light from the light source 2, for example, infrared light, falls on the entrance slit 5 through nondirected reflection via the optical imaging system 4; this has the advantage that all structural component parts of the device can be accommodated below the monitored surface covered by an ice layer and/or disturbing layer 1.

In the calculation of the thickness of the ice layer 1, the controlling and evaluating unit 8 must merely take into account the fact that with internal illumination the light must traverse the ice layer 1 two times.

Figure 3:
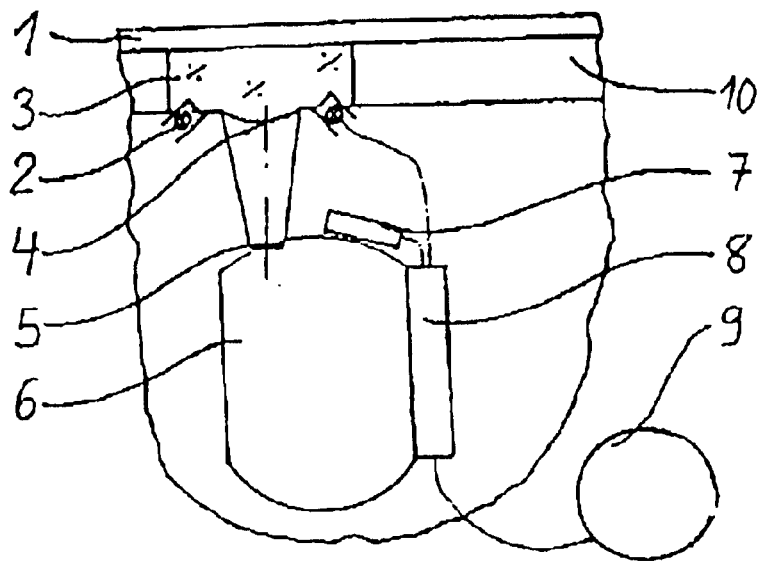
FIG. 3 shows a basic view of a third embodiment form of the device.

FIG. 3 shows a third embodiment form of the device in which a plurality of light sources 2 are arranged annularly in a base body 10. The holographic grating 6 with the entrance slit 5, the line receiver 7 and the controlling and evaluating unit 8 are provided as a compact structural part for special uses.

Figure 4:
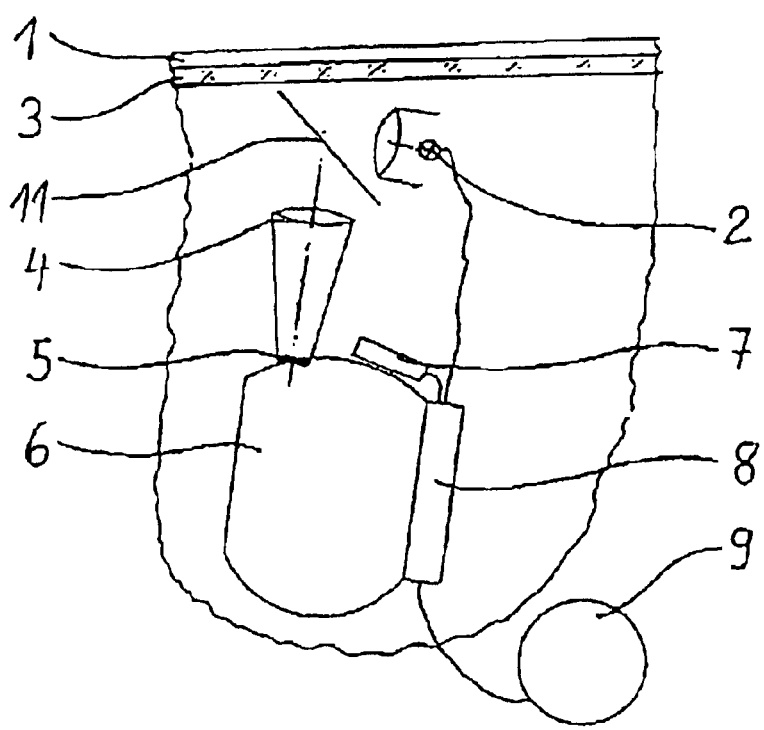
FIG. 4 shows a basic view of another embodiment form of the device.

FIG. 4 shows another embodiment form of the device in which a semitransparent mirror 11 is arranged between the light source 2 and the optical imaging system 4 for uniform and accurate illumination of the surface covered by an ice layer and/or disturbing layer 1.

The calculation steps needed during production of the apparatus according to the invention will be described more fully with reference to FIG. 5.

First, the correlation of pixels n to wavelengths λ, which is dependent upon the particular instance due to manufacturing tolerances, are determined. For this purpose, contrary to the use of the apparatus, a spectral lamp is initially used as a light source. The signal on the silicon detector 7 accordingly has several peaks. The exact position of the peaks is interpolated between the highest and second highest signal value within a peak by drawing a parabola through the highest value $y_n$ and the neighboring values $y_{n-1}$ and $y_{n+1}$. The exact position of the maximum on the detector (as a not necessarily whole pixel number) is calculated according to the following formula:

$$n_{max} = n + (y_{n-1} - y_{n+1})/(y_{n-1} - 2*y_n + y_{n+1}).$$

The peaks are associated with the wavelengths λ of the spectral lines causing them. As is well known, these wavelengths λ are given by the National Institute of Standards and Technology (NIST).

A parabola which assigns a pixel number to every wavelength λ, and vice versa, is fitted through the resulting pairs of values n and λ by compensation calculation. Coefficients $A_0$ to $A_2$ of the wavelength calibrating function which depend upon the particular instance are determined from:

$$n(\lambda) = A_0 + A_1 * \lambda + A_2 * \lambda^2.$$

Known chemometric methods can be used to determine the evaluation function B(n) needed for calculating the ice thickness. For this purpose, as many measurements as possible are to be made under various conditions with the apparatus according to the invention. Chemometric methods are known, for example, from "*Multivariate Calibration and Classification*", Naes, et al., NMR Publications, Chichester, UK 2002.

For the sake of simplicity, only two of the many measurements are taken for purposes of illustration, namely, a measurement a without ice layer and a measurement b with ice layer on the surface of the wing. The following sequence is provided:

Formation of net signals, taking the logarithm of the net signals, conversion of the abscissa values of pixels n into wavelengths λ according to the formula given above;

interpolation of the logarithmized net signals to equidistant wavelengths λ; the curves A shown in FIG. 5 for a (virtually) wavelength-independent reflecting surface, e.g., the surface of pressed barium oxide, B0 for the state without ice layer and B1 for the state with ice layer, which initially hardly differ from one another in this unprocessed form, are accordingly determined;

calculation of curves C0 for the state without ice layer and C1 for the state with ice layer, in each instance from the difference of curves B1 and B2 with curve A; curves C0 and C1 and the curves mentioned in the following are lengthened by a factor of ten for purposes of clearer illustration;

calculation of curves D0 for the state without ice layer and D1 for the state with ice layer as linear compensating straight lines through curves C0 and C1;

calculation of curves E0 for the state without ice layer and E1 for the state with ice layer, in each case as the difference of curves C0 and C1 with curves D0 and D1; this eliminates a changing or linearly increasing spectral background which is caused, for example, by contamination or aging of the light source 2; as can also be demonstrated mathematically, the chemometrically determined evaluation function B(n) will also eliminate a changing and linearly increasing spectral background;

chemometric determination of the evaluation function B(n); ideally, in the absence of interference, this could be a square curve F as is shown in FIG. 5; the evaluation function B(n) accordingly forms the peak surface below the ice absorption peak;

conversion of the abscissa of the evaluation function B(n) to pixel numbers n and interpolation to integral n; the evaluation function B(n) calculated in this way is stored in the evaluating unit 8; only this calculation step need be repeated when producing each additional identical apparatus.

The curves mentioned above are given by graphically connecting the signal values supplied by the individual pixels.

The calculation of curves C0 and C1 from the difference of curves B0 and B1 with curve A is indicated above and described in FIG. 5 for purposes of a clearer illustration and can be omitted when operating the apparatus.

In other words, a special circuit for evaluating the measured spectra is not required. It is advantageously realized by the software implemented in the controlling and evaluating unit 8. The curve evaluation algorithm is described in more detail with reference to the absorption curves shown in FIG. 5 for surfaces with and without coating in a wavelength range from 850 to 1150 nm.

FIG. 5 shows various measured absorption curves for surfaces with and without coating for a wavelength range of 850 to 1150 nm. To compensate for dark current, the values from the end of the spectral range are removed from all measurement values because the sensitivity of the silicon receiver line 7 is negligibly small in that area. Further, in order to increase accuracy, the dark current curve which differs from pixel to pixel can be taken into account, i.e., measurement values which are obtained in dim light without light incidence. The logarithms of all measured values obtained in this way are taken. The dark current values can vary depending on temperature because the algorithm contains dark current compensation. The voltage values of the pixels of the silicon receiver line 7 are fed successively to an analog-to-digital converter in the controlling and evaluating unit 8 and immediately converted into digital values and processed by the microprocessor, so that the measurements of the ice layer thickness and its growth rate are available without delay.

The reflection curve 1 of a surface without covering, for example, white standard, is taken once only when made as a starting curve for the measurements and is stored in the controlling and evaluating unit 8 in order to achieve a correction of the ice absorption by comparing the measurement values of the surface to be monitored which is covered by an ice layer and/or disturbing layer 1 with the stored measured values of the surface without covering. Subtracting curve 2 from curve 1 gives the absorption curve 3. The area of the curve 3 that is not affected by ice is then extrapolated linearly to below the peak, the wavelength range in which the ice absorption begins. The peak area shown in the integration limits of pixels 37–61 (white standard) is the sum of the absorption values within the integration limits and the area of a surface affected by the ice in which the ice absorption begins. An absorption curve 5 which is free from external influences is given by subtracting curve 4 from curve 3.

To determine the ice thickness in nm, the peak area in the wavelength range of ice absorption is determined by the difference between the absorption curves 5 with and without covering, wherein the ice thickness is determined in millimeters from the peak area proportional to the ice layer thickness by means of a conversion factor. The growth rate of the ice layer can be determined from a plurality of measured ice thickness values, for example, 10 to 50 ice thickness values, by means of a linear compensation calculation. The evaluation of the measured absorption curves of a surface of a structural component part can also be gathered by means of an evaluating matrix and determined by an algorithm in the controlling and evaluating unit 8.

The invention is not limited to the embodiment examples; rather, many variations are possible within the framework of the disclosure.

All new individual features and combined features disclosed in the description and/or drawing are considered essential to the invention.

What is claimed is:

1. Apparatus for determining the thickness of a layer of ice on the surface of a stationary or moving object, for example, of a building or aircraft, comprising
    a reception device wherein illumination light is initially directed to a surface portion of an object and then strikes the reception device,
    the reception device having dispersive optics for spectral dispersion of the illumination light coming from the surface portion and a detector for receiving the spectrally dispersed illumination light,
    an evaluating device for determining intensity values of the illumination light influenced by the ice layer at different wavelengths $\lambda$ and for comparing these intensity values with reference values from a surface that is free of ice,
    the reception device being arranged inside the object, and
    the surface of the object has, at the portion to which the illumination light is directed, a window that is transparent for the illumination light and through which the illumination light passes.

2. Apparatus according to claim 1, wherein the reception device comprises an optical imaging system, an entrance slit, an imaging holographic grating as dispersive optics, and a silicon detector having optoelectronic reception elements, each of which is associated with a determined wavelength $\lambda$, and the evaluating device is connected with a display for showing the measurements.

3. Apparatus according to claim 2, wherein a computation circuit is provided in the evaluating device for comparing the reception signals of the individual reception elements for a surface covered with ice to the reception signals for a surface which is free of ice and for calculating values from this comparison for the current thickness of the ice layer, and the values for the current thickness of the ice layer are shown on the display.

4. Apparatus according to claim 1, wherein the evaluating device contains a data storage for the values determined at given time intervals for the thickness of the ice layer, and a computation circuit which compares the values determined at different times for the thickness of the ice layer and determines information about the change in thickness of the ice layer over time from this comparison, and the information about the increase or decrease in thickness of the ice layer is indicated on the display.

5. Apparatus according to claim 4, wherein an infrared light source is provided as artificial light source.

6. Apparatus according to claim 1, wherein daylight or light from an artificial light source is provided as illumination light, wherein the artificial light source is arranged in the vicinity of the window, preferably outside the object, particularly preferably inside the object.

7. Apparatus according to claim 1, wherein wavelengths $\lambda$ of the illumination light in the range of approximately 850 nm to 1150 nm are provided for evaluation.

8. Apparatus according to claim 1, wherein the window is constructed as an optical filter which is transparent for light with the wavelengths $\lambda$ from approximately 850 nm to 1150 nm.

9. Apparatus according to claim 1, wherein a threshold switch is provided which is coupled to a sensor for evaluation of the daylight brightness and which communicates at least with the artificial light source, wherein the light source is switched on only when the brightness of the daylight is below a given threshold value.

10. Apparatus according to claim 1, wherein the evaluating device is coupled to an acoustic or optical warning device to notify of measurement results below a given limiting value.

11. A method for determining the thickness and growth rate of a layer of ice on structural component parts of means of transport, particularly aircraft such as airplanes, helicopters and wind-driven power stations or the like, comprising the steps of:
    illuminating the surface of a structural component part which is to be monitored and which is covered by an ice layer and/or disturbing layer in such a way that radiation passing through the ice layer and/or disturbing layer is measured and evaluated in different wavelength regions;
    separating radiation incident on a surface covered by an ice layer and/or disturbing layer spectrally by a holographic grating connected with a line receiver into enough wavelength regions that a correction of the ice absorption is achieved by comparing measured radiation with a stored reflection curve of an uncoated surface and by combining the comparison values and determining the peak area in the wavelength region of the ice absorption; and
    determining and displaying the growth rate of the ice layer from the thickness of the ice layer and/or disturbing layer and by the ice thickness values obtained in the measurement intervals.

12. The method according to claim 11, wherein the determined absorption curves can be evaluated by an algorithm by a microprocessor of a controlling and evaluating unit.

13. The method according to claim 11, wherein the spectroanalytic measurement is carried out in wavelength ranges from approximately 850 to 1150 nm.

14. The method according to claim 11, wherein the measured values of a surface without a coating are stored in a controlling and evaluating unit as comparison values.

15. The method according to claim 11, wherein of all the measured values of a surface coated with an ice layer and/or disturbing layer, the measured values from the long-wave end of a spectral region are not taken into account.

16. The method according to claim 11, wherein the ice thickness is determined in millimeters from the peak area which is proportional to the thickness of the ice layer by means of a conversion factor.

17. The method according to claim 11, wherein the growth rate of the ice layer is determined from a large number of determined ice thickness values.

18. The method according to claim 11, wherein the controlling and evaluating unit issues a warning to clean the window or change the light source when the measured signal falls below a threshold in spite of the light source being switched on.

19. A device comprising:
 a window being provided in a surface covered by an ice layer or disturbing layer;
 an imaging holographic grating;
 a beam extending through said window impinging on said imaging holographic grating via an optical imaging system and an entrance slit;
 said beam being separated by wavelength and imaged on a line receiver;
 a controlling and evaluating unit for evaluating the imaged information; and a display for displaying the evaluated data.

20. The device according to claim 19, wherein the beam falling through the window impinges directly on the holographic grating through the entrance slit.

21. The device according to claim 19, wherein a light source for illuminating the window is arranged above the surface covered by an ice layer or disturbing layer.

22. The device according to claim 19, wherein the light source for illuminating the window is arranged below the surface covered by an ice layer or disturbing layer.

23. The device according to claim 19, wherein a plurality of light sources, arranged annularly in a base body, are provided for illuminating the window.

24. The device according to claim 19, wherein the light source for illuminating the window in the surface covered by an ice layer or disturbing layer is not turned on by the controlling and evaluating device when there is sufficient daylight.

25. The device according to claim 19, wherein a semi-transparent mirror is arranged in front of the optical imaging system.

26. The device according to claim 19, wherein the evaluating data can be sent to an existing data bus system.

27. The device according to claim 19, wherein the device with the optical imaging system, the entrance slit, the holographic grating, the line receiver, and the evaluating unit is constructed as a compact structural component part.

* * * * *